United States Patent [19]

Bott et al.

[11] Patent Number: 5,173,518

[45] Date of Patent: Dec. 22, 1992

[54] PREPARATION OF CELLULAR POLYURETHANE ELASTOMERS USING POLYETHER CARBONATE DIOLS AS A STARTING COMPONENT

[75] Inventors: Kaspar Bott, Mannheim; Horst King, Lemfoerde; Claudia Spang, Frankenthal; Roland Minges, Gruenstadt; Wolfgang Straehle, Heidelberg, all of Fed. Rep. of Germany

[73] Assignee: BASF Aktiengesellschaft, Ludwigshafen, Fed. Rep. of Germany

[21] Appl. No.: 817,189

[22] Filed: Jan. 6, 1992

[30] Foreign Application Priority Data

Jan. 25, 1991 [DE] Fed. Rep. of Germany ....... 4102174

[51] Int. Cl.⁵ .......................................... C08G 18/14
[52] U.S. Cl. .................................... 521/172; 521/173
[58] Field of Search ............................... 521/172, 173

[56] References Cited

U.S. PATENT DOCUMENTS

| | | | |
|---|---|---|---|
| 3,764,457 | 10/1973 | Chang et al. | 525/467 |
| 4,423,205 | 12/1983 | Rajan | 528/371 |
| 4,456,745 | 6/1984 | Rajan | 528/85 |
| 4,463,141 | 7/1984 | Robinson | 525/467 |
| 4,510,333 | 4/1985 | Pruckmayr | 568/617 |
| 4,713,399 | 12/1987 | Webb et al. | 521/131 |
| 4,751,252 | 6/1988 | Clatty | 521/114 |

FOREIGN PATENT DOCUMENTS 335416 10/1989 European Pat. Off. .

Primary Examiner—Morton Foelak
Attorney, Agent, or Firm—William G. Conger; Dennis V. Carmen

[57] ABSTRACT

A process for the preparation of cellular polyurethane elastomers involves reacting a) an organic and/or modified organic polyisocyanate with b) a polyether polycarbonate diol which contains bonded polyoxytetramethylene glycol radicals having a mean molecular weight Mn (number average) of from 150 to 500, and, if desired, c) a low-molecular-weight chain extender and/or crosslinking agent, in the presence of d) a blowing agent, e) a catalyst and f) if desired additives and/or assistants.

10 Claims, No Drawings

PREPARATION OF CELLULAR POLYURETHANE ELASTOMERS USING POLYETHER CARBONATE DIOLS AS A STARTING COMPONENT

The present invention relates to a process for the preparation of cellular polyurethane elastomers, also abbreviated to PU elastomers below, using a polyether polycarbonate diol which contains bonded polyoxytetramethylene glycol radicals having a mean molecular weight Mn (number average) of from 150 to 500.

The preparation of cellular PU elastomers by reacting organic polyisocyanates with organic polyhydroxyl compounds in the presence of catalysts and possibly chain extenders and/or crosslinking agents and blowing agents, assistants and/or additives is known. A suitable choice of the hydroxyl-containing polyesters, polyethers, polyester amides, inter alia, and organic polyisocyanates and the additional use of chain extenders, for example glycols, trihydric alcohols and/or diamines, allows both elastic and rigid, cellular PU elastomers and all modifications between the two to be prepared by this method.

The preparation of PU elastomers, their mechanical properties and their use are described, for example, in High Polymers, Volume XVI, Polyurethanes, parts I and II, by I. H. Saunders and K. C. Frisch (Interscience Publishers, New York, 1962 and 1964 respectively) and in Kunststoff-Handbuch, Volume VII, Polyurethane, 1966 and 1983 by Dr. R. Vieweg and Dr. A. Höchtlen, and Dr. G. Oertel respectively (Carl-Hanser-Verlag, Munich).

Cellular PU elastomers, due to their excellent vibration- and shock-absorbing properties, are used, for example, in the automotive industry to improve the driving stability of motor vehicles and in the shoe industry as a sole material or as shoe cores. It is desired that the good mechanical properties of PU elastomers of this type can be used over a very wide temperature range and are also retained as the temperature drops.

Hitherto, the soft phase used in cellular PU elastomers was usually a polyether-polyol or a polyester-polyol. Thus, U.S. Pat. No. 4,423,205 and U.S. Pat. No. 4,456,745 describe the preparation of polyurethanes using RIM technology, in which polycarbonate diols made from cyclic carbonates are employed. Polyurethanes prepared from poly(tetramethylene ether) glycol having a narrow molecular weight distribution are described in EP-A-167,292. Although polyurethanes which contain, as diol component, a polyether polycarbonate diol are described in U.S. Pat. No. 4,463,141, the mean molecular weight Mn (number average) of the polyoxytetramethylene diol employed is, however, greater than 500. Polyether polycarbonate diols which contain aromatic structural units are mentioned in DE-A-2 726 416. EP-A-335 416 describes a carbonate-modified polyoxytetramethylene glycol and its preparation.

PU elastomers based on polyesters polyols are usually not resistant to microorganisms. Replacement of polyester-polyols by microbe-resistant polyether-polyols results in impairment of the mechanical properties, in particular at low temperatures.

It is an object of the present invention to develop cellular PU elastomers which have improved mechanical properties, in particular significantly increased elongation at break, at room temperature and at lower temperatures.

We have found that, surprisingly, this object is achieved by using specific polyether polycarbonate diols as the soft phase for the preparation of cellular PU elastomers.

The invention accordingly provides a process for the preparation of a cellular polyurethane elastomer by reacting
a) an organic and/or modified organic polyisocyanate with
b) at least one relatively high-molecular-weight polyhydroxyl compound and, if desired,
c) a low-molecular-weight chain extender and/or crosslinking agent,
in the presence of
d) a blowing agent,
e) a catalyst and
f) if desired additives and/or assistants,
wherein the relatively high-molecular-weight polyhydroxyl compound (b) is a polyether polycarbonate diol prepared by polycondensing
b1) a polyoxytetramethylene glycol having a mean molecular weight Mn (number average) of from 150 to 500 or
b2) a mixture comprising
b2i) at least 10 mol-%, preferably from 50 to 95 mol-%, of the polyoxytetramethylene glycol (b1) and
b2ii) less than 90 mol-%, preferably from 5 to 50 mol-%, of at least one polyoxyalkylene diol, other than (b1), comprising an alkylene oxide having 2 to 4 carbon atoms in the alkylene radical, at least one linear or branched alkanediol having 2 to 14 carbon atoms or at least one cyclic alkanediol having 3 to 15 carbon atoms or a mixture of at least two of said diols (b2ii)
with
b3) phosgene, diphenyl carbonate or a dialkyl carbonate containing $C_1$- to $C_4$-alkyl groups.

The invention furthermore provides a process for the production of PU elastomer moldings, preferably shock absorbers, by a process as claimed in claim 1.

The cellular PU elastomers prepared by the process according to the invention have improved mechanical properties, in particular very good elongation at break. The good processing properties of the PU formulations in low-pressure processes is furthermore noteworthy.

The following applies to the starting components (a), (b), (d), (e) and, if used, (c) and (f) which can be used for the process according to the invention for the preparation of cellular PU elastomers:

a) Suitable organic polyisocyanates are conventional aliphatic, cycloaliphatic, araliphatic and preferably aromatic polyisocyanates.

The following may be mentioned as specific examples: alkylene diisocyanates having 4 to 12 carbon atoms in the alkylene moiety, such as 1,12-dodecane diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate and any desired mixtures of these isomers, 1-isocyanato-3,3,5-trimethyl-5-isocyanatomethylcyclohexane (isophorone diisocyanate), 2,4- and 2,6-hexahydrotolylene diisocyanate and corresponding isomer mixtures, 4,4'-, 2,2'- and 2,4'-dicyclohexylmethane diisocyanate and the corresponding isomer mixtures, and preferably aromatic diisocyanates, for example 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'- and 2,4'-diphenylmethane diisocyanates and in particular 4,4'-diphenylmethane diisocyanate and 1,5-naphthylene diisocyanate. The organic diisocyanates may be employed individually or in the form of mixtures.

Suitable organic polyisocyanates are also modified polyisocyanates, i.e. products obtained by chemical reaction of organic polyisocyanates. Mention may be made, for example, of ester-, urea-, biuret-, allophanate-, carbodiimide- and/or urethane-containining diisocyanates and/or polyisocyanates. Specific examples are the following: urethane-containing organic, preferably aromatic, polyisocyanates containing from 33.6 to 14% by weight, preferably from 28 to 16% by weight, based on the total weight, of NCO, for example 4,4'-diphenylmethane diisocyanate or 2,4- or 2,6-tolylene diisocyanate modified by means of low-molecular-weight diols, triols, dialkylene glycols, trialkylene glycols or polyoxyalkylene glycols having molecular weights of up to 3000, specific examples of di- and polyoxyalkylene glycols, which may be employed individually or as mixtures, being diethylene glycol, dipropylene glycol, dibutylene glycol, polyoxyethylene glycol, polyoxypropylene glycol, polyoxytetramethylene glycol and polyoxypropylene polyoxyethylene glycol. Also suitable are NCO-containing prepolymers containing from 14 to 2.5% by weight, preferably from 9 to 3.0 % by weight, based on the total weight, of NCO and prepared from the polyoxyalkylene glycols mentioned above preferably from the polyether polycarbonate diols which can be used according to the invention and are described below and 4,4'-diphenylmethane diisocyanate, mixtures of 2,4'- and 4,4'-diphenylmethane diisocyante, 2,4- and 2,6-tolylene diisocyanates or 1,5-naphthylene diisocyanates. Furthermore, liquid carbodiimide-containing polyisocyanates containing from 33.6 to 15% by weight, preferably from 31 to 21% by weight, based on the total weight, of NCO, for example based on 4,4'-, 2,4'- and/or 2,2'-diphenylmethane diisocyanate and/or 2,4- and 2,6-tolylene diisocyanate, have proven successful.

The modified polyisocyanates can, if desired, be mixed with one another or with unmodified organic polyisocyanates, for example 2,4'- and/or 4,4'-diphenylmethane diisocyanate and/or 2,4- and/or 2,6-tolylene diisocyanate, but the functionality of the polyisocyanate mixture obtained is at most 3, preferably from 2 to 2.6, in particular from 2.0 to 2.4.

Organic polyisocyanates which have proven particularly successful and are therefore preferred are 1,6-hexamethylene diisocyanate, isophorone diisocyanate and in particular 4,4'-diphenylmethane diisocyanate and 1,5-naphthylene diisocyanate, and liquid urethane-, carbodiimide- or urethane- and carbodiimide-modified polyisocyanates based on mixtures of 4,4'- and 2,4'-diphenylmethane diisocyantes and in particular on 4,4'-diphenylmethane diisocyanate.

b) The relatively high-molecular-weight polyhydroxyl compound (b) comprises at least one polyether polycarbonate diol prepared by polycondensing b1) a polyoxytetramethylene glycol having a mean molecular weight Mn (number average) of from 150 to 500, preferably from 150 to 400, in particular from 200 to 350, or b2) a mixture comprising b2i) at least one polyoxytetramethylene glycol (b1) and b2ii) at least one polyoxyalkylene diol, other than (b1), having a molecular weight of from 150 to 2000, preferably from 500 to 2000, prepared, for example, by anionic polymerization in the presence of an alkali metal hydroxide or alkoxide as basic catalyst and with addition of at least one difunctional initiator molecular or by cationic polymerization using a Lewis acid or bleaching earth as catalyst from one or more alkylene oxides having 2 to 4 carbon atoms in the alkylene moiety, for example 1,3-propylene oxide, 1,2- or 2,3-butylene oxide or preferably ethylene oxide, 1,2-propylene oxide or tetrahydrofuran, at least one linear or branched alkanediol having 2 to 14 carbon atoms, preferably 2 to 6 carbon atoms, or at least one cyclic alkanediol having 3 to 15 carbon atoms, preferably 5 to 8 carbon atoms, or a mixture of at least two of said diols (b2ii) in the abovementioned (b2i):(b2ii) mixing ratios, with b3) phosgene, diphenyl carbonate or a dialkyl carbonate containing $C_1$- to $C_4$-alkyl groups.

The polyoxytetramethylene glycol (b1) can be prepared by conventional methods, for example by cationic polymerization of tetrahydrofuran.

In order to modify the mechanical properties of the PU elastomers and the polyether polycarbonate diols, they can also be prepared using mixtures of (b2i) and the diols (b2ii).

The polyoxyalkylene diol which is different from (b1) is preferably a polyoxytetramethylene glycol having a molecular weight of greater than 500, in particular from 650 to 2000. However, suitable compounds are also polyoxyethylene glycol, polyoxypropylene glycol, polyoxypropylenepolyoxyethylene glycol, polyoxytetramethylenepolyoxypropylene glycol and polyoxytetramethylenepolyoxyethylene glycol.

Examples of suitable linear or branched alkanediols are ethanediol, 1,3- and 1,2-propanediol, 2,2-dimethyl-1,3-propanediol, 1,3- and 1,4-butanediol, 1,5-pentanediol, 1,6-hexanediol, 1,7-heptanediol, 1,8-octanediol, 1,10-decanediol and 1,12-dodecanediol. Furthermore, cyclic alkanediols, for example 1,4-dihydroxycyclohexane, 1,4-di(hydroxymethyl)cyclohexane and 4,4'-dihydroxydicyclohexylmethane, have proven suitable.

The diols (b2ii) can be used individually or in the form of mixtures.

The polyether polycarbonate diol is preferably prepared using a polyoxytetramethylene diol (b1). However, if mixtures of (b1) and (b2ii) are used as described above, they contain at least 10 mol-%, preferably from 50 to 95 mol-%, in particular from 60 to 90 mol-%, of (b1), based on (b1) and (b2ii).

Component b3) may be phosgene in pure or technical-grade form or diluted with a gas which is inert under the condensation conditions. Preferred carbonates are dialkyl carbonates containing $C_1$- to $C_4$- alkyl groups, in particular dimethyl carbonate, diethyl carbonate and dipropyl carbonate. Diphenyl carbonate is also suitable. It is also possible to use mixtures of the carbonates.

The mixing ratio between the polyoxytetramethylene diol b2i), with, if used, further diols b2ii), and the carbonate component b3) depends on the desired molecular weight of the polyether polycarbonate diol and on the carbonate component employed.

In some cases, losses of the carbonate employed occur during the reaction, and this must thus be employed in relatively large amounts. In the case of phosgene, the excess depends on the amount of phosgene expelled with the hydrochloric acid formed and in the particularly preferred case of dialkyl carbonates on whether the carbonate employed forms an azeotrope with the alcohol produced on transesterification, the excess being from 0.5 to 50 mol-%, preferably from 5 to 35 mol-%.

The reaction of b1), if desired mixed with b2ii), with the carbonate component is preferably carried out in the presence of a catalyst.

Catalysts which can be used are conventional transesterification catalysts, for example tetraisopropyl orthotitanate, dibutyltin oxide, dibutyltin dilaurate and zirconium(IV) acetylacetonate, and alkali metal alkoxides, for example sodium methoxide, sodium ethoxide and potassium ethoxide. The amount of catalyst is from 0.001 to 2%, preferably from 0.01 to 0.5%, based on the total amount of starting materials.

The reaction components are preferably heated to the boil with the catalyst. If a dialkyl carbonate is used, the corresponding alcohol or carbonate/alcohol azeotrope formed during the reaction can be removed by distillation. The transesterification is generally carried out at from 20° to 250° C., preferably at from 40° to 200° C. If phosgene is used, the reaction can be carried out at from 0° to 100° C., preferably at from 20° to 80° C. In this case, a base, for example pyridine or triethylamine, is preferably added to the reaction mixture in order to neutralize the hydrochloric acid formed.

If the catalyst used is an alkali metal alkoxide, a reaction temperature of from 20° to 150° C., in particular from 40° to 80° C., is preferred, and the catalyst is removed by neutralization with an acid, such as phosphoric acid, and removal of the precipitated alkali metal salt of the particular acid.

If the catalyst used is tetraisopropyl orthotitanate, a reaction temperature of from 40° to 250° C., in particular from 100° to 200° C., is preferred, and the excess catalyst can be deactivated when the reaction is complete, for example by adding phosphoric acid.

Thee reaction can be carried out at atmospheric pressure, under reduced pressure or under superatmospheric pressure. A reduced pressure of from 0.1 to 5 mbar is usually applied at the end of the reaction in order to remove the final residues of low-boiling components. The reaction is complete when no further low-boiling components distil over.

The polyether polycarbonate diol produced has a mean molecular weight Mn (number average) of from 800 to 8000, preferably from 1200 to 6000, in particular from 1800 to 4200.

c) The cellular PU elastomer can be prepared in the presence or absence of a chain extender and/or crosslinking agent. However, to modify the mechanical properties, for example the hardness, elasticity, inter alia, the addition of a chain extender, crosslinking agent or if desired a mixture of the two may prove advantageous. The chain extender and/or crosslinking agent used is a diol and/or triol having a molecular weight of less than 400, preferably from 60 to 300. Examples of suitable compounds are aliphatic, cycloaliphatic and/or araliphatic diols having 2 to 14, preferably 4 to 10, carbon atoms, for example ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl)hydroquinone, triols, such as 1,2,4- and 1,3,5-trihydroxycyclohexane, glycerol and trimethylolpropane, and low-molecular-weight hydroxyl-containing polyalkylene oxides based on ethylene oxide and/or 1,2-propylene oxide, and the abovementioned diols and/or triols as initiator molecules.

The cellular PU elastomer can also be prepared using secondary aromatic diamines, primary aromatic diamines, 3,3'-di- and/or 3,3',5,5'-tetraalkyl-substituted diaminodiphenylmethanes in addition to the abovementioned diols and/or triols or mixed with these as chain extender or crosslinking agent.

Examples of secondary aromatic diamines are N,N'-dialkyl-substituted aromatic diamines, which may also be substituted on the aromatic ring by alkyl radicals, having 1 to 20, preferably 1 to 4, carbon atoms in the N-alkyl radical, such as N,N'-diethyl-, N,N'-di-sec-pentyl-, N,N'-di-sec-hexyl-, N,N'-di-sec-decyl-, N,N'- dicyclohexyl-p- or -m-phenylenediamine, N,N'-dimethyl-, N,N'-diethyl-, N,N'-diisopropyl-,N,N'-di-sec-butyl-, N,N'-dicyclohexyl-4,4'-diaminodiphenylmethane and N,N'-di-secbutylbenzidine.

The aromatic diamines used are expediently those which contain at least one alkyl substituent in the ortho-position to the amino groups, are liquid at room temperature and are miscible with the polyether polycarbonate diols. Furthermore, alkyl-substituted meta-phenylenediamines of the formulae

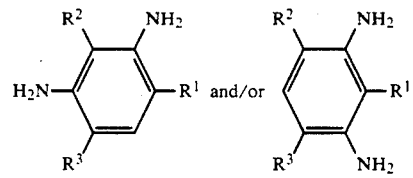

where $R^3$ and $R^2$ are identical or different methyl, ethyl, propyl or isopropyl radicals, and $R^1$ is linear or branched alkyl having 1 to 10, preferably 4 to 6, carbon atoms have proved successful.

Particular success has been achieved using alkyl radicals $R^1$ in which the branching point is on the $C^1$ carbon atom. Examples of radicals $R^1$ are methyl, ethyl, isopropyl, 1-methyloctyl, 2-ethyloctyl, 1-methylhexyl, 1,1-dimethylpentyl, 1,3,3-trimethylhexyl, 1-ethylpentyl, 2-ethylpentyl and preferably cyclohexyl, 1-methyl-n-propyl, tert-butyl, 1-ethyl-n-propyl, 1-methyl-n-butyl and 1,1-dimethyl-n-propyl.

Examples of suitable alkyl-substituted m-phenylenediamines are 2,4-dimethyl-6-cyclohexyl-, 2-cyclohexyl-4,6-diethyl-, 2-cyclohexyl-2,6-isopropyl-, 2,4-dimethyl-6-(1-ethyl-n-propyl)-, 2,4-dimethyl-6-(1,1-dimethyl-n-propyl)- and 2-(1-methyl-n-butyl)4,6-dimethyl-1,3-phenylenediamine. Preference is given to 1-methyl-3,5-diethyl-2,4- and -2,6-phenylenediamines, 2,4-dimethyl-6-tert-butyl-, 2,4-dimethyl-6-isooctyl- and 2,4-dimethyl-6-cyclohexyl-1,3-m-phenylenediamine.

Examples of suitable 3,3'-di- and 3,3',5,5'-tetra-n-alkyl-substituted 4,4'-diaminodiphenylmethanes are 3,3'-di-, 3,3',5,5'-tetramethyl-, 3,3'-di-, 3,3',5,5'-tetraethyl-, 3,3'-di- and 3,3',5,5'-tetra-n-propyl-4,4'-diaminodiphenylmethane.

Preference is given to diaminodiphenylmethanes of the formula

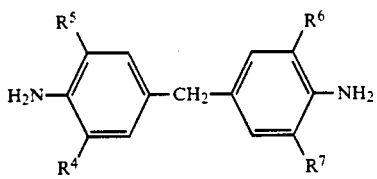

where $R^4$, $R^5$, $R^6$ and $R^7$ are identical or different and are methyl, ethyl, propyl, isopropyl, sec-butyl or tert-butyl, but where at least one of the radicals must be isopropyl or sec-butyl. 4,4'-Diaminodiphenylmethanes can also be used mixed with isomers of the formulae

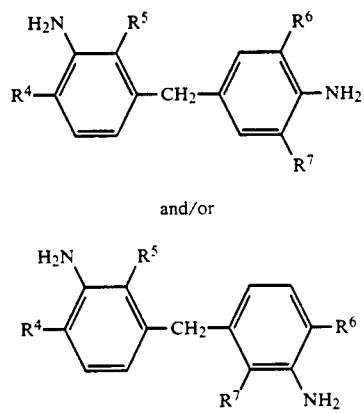

and/or where $R^4$, $R^5$, $R^6$ and $R^7$ are as defined above.

Preference is given to 3,5-dimethyl-3',5'-diisopropyl- and 3,3',5,5'-tetraisopropyl-4,4'-diaminodiphenylmethane. The diaminodiphenylmethanes can be employed individually or in the form of mixtures.

Said chain extenders and/or crosslinking agents (c) can be used individually or as mixtures of identical or different types of compound.

The chain extender, crosslinking agent or mixture thereof is expediently used, if at all, in an amount of from 2 to 60% by weight, preferably from 8 to 50% by weight, in particular from 10 to 40% by weight, based on the weight of the polyether polycarbonate diol (b) plus (c).

d) The preferred blowing agent (d) is water, which reacts with the organic, modified or unmodified polyisocyanates (a) to form carbon dioxide and urea groups, thus affecting the compressive strength of the end product. The water is usually used in an amount of from 0.05 to 6% by weight, preferably from 0.1 to 4% by weight, in particular from 0.15 to 2.5% by weight, based on the weight of components (a), (b) and, if used, (c).

The blowing agent (d) may alternatively be, instead of, or preferably in combination with, water, a low-boiling liquid which evaporates under the conditions of the exothermic polyaddition reaction and advantageously has a boiling point of from −40° to 120° C., preferably from 10 to 90° C., at atmospheric pressure, or a gas.

The liquids of the abovementioned type and gases which are suitable as blowing agents may be selected, for example, from the group comprising the alkanes, which advantageously have 3 to 5 carbon atoms, e.g. propane, n- and isobutane, n- and isopentane and preferably technical-grade pentane mixtures, cycloalkanes, which advantageously have 4 to 6 carbon atoms, e.g. cyclobutane, cyclopentene, cyclohexene and preferably cyclopentane and/or cyclohexane, dialkyl ethers, e.g. dimethyl ether, methyl ethyl ether and diethyl ether, cycloalkylene ethers, e.g. furan, ketones, e.g. acetone and methyl ethyl ketone, carboxylic acid esters, such as methyl formate, fluoroalkanes which are degraded in the troposphere and therefore do not damage the ozone layer, e.g. trifluoromethane, difluoromethane, difluoroethane, tetrafluoroethane and heptafluoroethane, and gases, e.g. nitrogen, carbon monoxide and noble gases, e.g. helium, neon and krypton. It is furthermore possible to use chlorofluorohydrocarbons, e.g. trichlorofluoromethane and trichlorotrifluoroethane.

The most expedient amount of low-boiling liquid or gas, which can in each case be employed individually or as a mixture of liquids or a mixture of gases or as a mixture of gases and liquids, depends on the desired density and the amount of water employed. The necessary amount can easily be determined by simple preliminary experiments. Satisfactory results are usually given by amounts of from 0.5 to 20 parts by weight, preferably from 2 to 10 parts by weight, of liquid and from 0.01 to 30 parts by weight, preferably from 2 to 20 parts by weight, of gas, in each case based on 100 parts by weight of components (a), (b) and, if used, (c).

e) The catalyst (e) used for the preparation of the PU elastomer is, in particular, a compound which greatly accelerates the reaction of the hydroxyl-containing compounds of component (b) and, if used, (c) with the organic, modified or unmodified polyisocyanates (a). Suitable catalysts are organometallic compounds, preferably organotin compounds, such as tin(II) salts of organic carboxylic acids, e.g. tin(II) diacetate, tin(II) dioctanoate, tin(II) diethylhexanoate and tin(II) dilaurate, and the dialkyltin(IV) salts of organic carboxylic acids, e.g. dibutyltin diacetate, dibutyltin dilaurate, dibutyltin maleate and dioctyltin diacetate. The organometallic compounds are employed individually or preferably in combination with highly basic amines. Examples are amidines, such as 2,3-dimethyl-3,4,5,6-tetrahydropyrimidine, tertiary amines, such as triethylamine, tributylamine, dimethylbenzylamine, N-methyl-, N-ethyl- and N-cyclohexylmorpholine, N,N,N',N'-tetramethylethylenediamine, N,N,N',N'-tetramethylbutanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane and preferably 1,4-diazabicyclo[2.2.2]octane, and alkanolamine compounds, such as triethanolamine, triisopropanolamine, N-methyl- and N-ethyldiethanolamine and dimethylethanolamine.

f) The cellular PU elastomer may also be prepared in the presence of additives and/or assistants (f).

Examples of additives and assistants which may be mentioned are surfactants, foam stabilizers, cell regulators, lubricants, fillers, dyes, pigments, crystalline, microporous molecular sieves, flameproofing agents, hydrolysis stabilizers, and fungistatic and bacteriostatic substances.

Examples of surfactants are compounds which support homogenization of the starting materials and may also be suitable for regulating the cell structure. Examples which may be mentioned are emulsifiers, such as the sodium salts of castor oil sulfates or of fatty acids, and salts of fatty acids with amines, e.g. diethylamine oleate, diethanolamine stearate and diethanolamine ricinoleate, salts of sulfonic acids, e.g. alkali metal salts or ammonium salts of dodecylbenzene- or dinaphthylmethanedisulfonic acid and ricinoleic acid; foam stabilizers, such as siloxane-oxyalkylene copolymers and other organopolysiloxanes, oxyethylated alkylphenols, oxyethylated fatty alcohols, paraffin oils, castor oil esters, ricinoleic acid esters, Turkey red oil and groundnut oil, and cell regulators, such as paraffins, fatty alcohols and dimethylpolysiloxanes. Suitable compounds for improving the emulsification action and the cell structure and/or for stabilizing the foam are furthermore oligomeric polyacrylates containing polyoxyalkylene and fluoroalkane radicals as side groups. The surfactants are usually used in amounts of from 0.01 to 5 parts by weight, based on 100 parts by weight of component (b).

A particularly successful lubricant is a ricinoleic acid polyester having a molecular weight of from 1500 to 3500, preferably from 2000 to 3000, which is expediently employed in an amount of from 0.5 to 10% by weight, preferably from 5 to 8% by weight, based on the weight of component (b) or of components (b) and (c).

For the purposes of the present invention, fillers, in particular reinforcing fillers, are conventional organic or inorganic fillers, reinforcing agents, weighting agents, agents for improving the abrasion behavior in paints, coating agents, etc. Specific examples are inorganic fillers, such as silicate minerals, for example phyllosilicates, such as antigorite, serpentine, hornblends, amphiboles, chrysotile, and talc; metal oxides, such as kaolin, aluminum oxides, aluminum silicate, titanium oxides and iron oxides, metal salts, such as chalk, baryte and inorganic pigments, such as cadmium sulfide, zinc sulfide and glass particles. Examples of suitable organic fillers are carbon black, melamine, colophony, cyclopentadienyl resins and graft polymers.

The inorganic or organic fillers may be used individually or as mixtures and are advantageously introduced into the reaction mixture in amounts of from 0.5 to 50 % by weight, preferably from 1 to 40% by weight, based on the weight of components (a) to (c).

In order to produce PU elastomer moldings having an essentially pore-free, smooth surface when water or a water-containing physical blowing agent is used, it has proven particularly expedient to add a crystalline, microporous molecular sieve having a cavity diameter of less than 1.3 nm, preferably less than 0.7 nm, and comprising a metal oxide or metal phosphate. Molecular sieves of this type are described in the literature.

Suitable metal oxides essentially comprise aluminum silicon oxide, boron silicon oxide, iron(III) silicon oxide, gallium silicon oxide, chromium(III) silicon oxide, beryllium silicon oxide, vanadium silicon oxide, antimony(V) silicon oxide, arsenic(III) silicon oxide, titanium(IV) silicon oxide, aluminum germanium oxide, boron germanium oxide, aluminum zirconium oxide and aluminum hafnium oxide. Specific examples are aluminosilicate, borosilicate, iron silicate or gallium silicate zeolites having a pentasil structure. Preference is given to mordenite in the H form, Na form or ammonium form, offretite in the H form, K form, Na form or ammonium form, zeolite ZSM-5 in the H form, Na form or ammonium form, zeolite ZSM-11, zeolite ZSM-12, betazeolite, clinopthilolite, ferrierite, ultrastable Y-zeolite, ultrastable mordenite or silicalites or mixtures of at least 2 of said zeolites.

Suitable metal phosphates are aluminum phosphates or silicoaluminum phosphates, which may additionally contain cations of lithium, beryllium, boron, magnesium, gallium, germanium, arsenic, titanium, manganese, iron, cobalt or zinc. Examples of metal phosphates of said type are APO, SAPO, ELAPO, ELAPSO, MeAPO and MeAPSO. Preference is given to zirconium phosphates in the H form, Na form or ammonium form, zirconium phosphate silicates, titanium phosphates, VPI-5 and MCM-9.

The crystalline, microporous molecular sieves having a cavity diameter of less than 1.3 nm comprising metal oxides or metal phosphates are usually used in an amount of from 1 to 30% by weight, preferably from 5 to 20% by weight, in particular from more than 10 to 16% by weight, based on the weight of components (b) and, if used, (c).

Examples of suitable flameproofing agents are tricresyl phosphate, tris(2-chloroethyl) phosphate, tris(2-chloropropyl) phosphate, tris(1,3-dichloropropyl) phosphate, tris(2,3-dibromopropyl) phosphate and tetrakis(2-chloroethyl)ethylene diphosphate.

In addition to the abovementioned halogen-substituted phosphates, it is also possible to use inorganic flameproofing agents, such as red phosphorus, expandable graphite, aluminum oxide hydrate, antimony trioxide, arsenic oxide, ammonium polyphosphate or calcium sulfate, or a cyanuric acid derivative, e.g. melamine, or a mixture of two or more flameproofing agents, e.g. expandable graphite and ammonium polyphosphate, expandable graphite, melamine and ammonium polyphosphate, ammonium polyphosphates and melamine and, if desired, starch in order to flameproof the moldings produced according to the invention. In general, it has proven expedient to use from 2 to 40 parts by weight, preferably from 5 to 25 parts by weight, of said flameproofing agents or mixtures per 100 parts by weight of components (a) to (c).

Further details on the other conventional assistants and additives mentioned above can be obtained from the specialist literature, for example from the monograph by J. H. Saunders and K. C. Frisch, High Polymers, Volume XVI, Polyurethanes, parts 1 and 2, Interscience Publishers 1962 and 1964 respectively, or Kunststoff-Handbuch, Polyurethane, Volume VII, Carl-Hanser-Verlag, Munich, Vienna, 1st and 2nd editions, 1966 and 1983, respectively.

To prepare the PU elastomer or produce moldings from a PU elastomer, the organic, modified or unmodified polyisocyanate (a), the relatively high-molecular-weight compound containing at least two reactive hydrogen atoms (b) and, if desired, the low-molecular-weight chain extender and/or crosslinking agent are reacted in such amounts that the equivalence ratio between the NCO groups of the polyisocyanate (a) and the total number of reactive hydrogen atoms in components (b) and, if used, (c) is from 1:0.3 to 1:2, preferably from 1:0.4 to 1:1.7, in particular from 1:0.9 to 1:1.1.

The PU elastomer can be prepared or moldings can be produced from the PU elastomer by known processes, e.g. by the prepolymer or semiprepolymer process or by the one-shot process using the high-pressure or, preferably, low-pressure method. Moldings are expediently produced in a closed, heatable mold, e.g. a metallic mold, for example made of aluminum, cast iron or steel, or a mold made from a fiber-reinforced polyester or epoxy resin molding material. Low-viscosity formulations which have good flow properties and therefore improved processing properties can also be converted into moldings by reaction injection molding (RIM).

These procedures are described, for example, by Dr. H. Piechota and Dr. H. Röhr in Integralschaumstoffe, Carl-Hanser-Verlag, Munich, Vienna, 1975; D. J. Prepelka and J. L. Wharton in Journal of Cellular Plastics, March/April 1975, pages 87 to 98; U. Knipp in Journal of Cellular Plastics, March/April 1973, pages 76 to 84, and in Kunststoff-Handbuch, Volume 7, Polyurethane, 2nd Edition, 1983, pages 333 ff.

It has proven particularly advantageous to use the two-component process and to combine components (b), (d), (e) and, if used, (c) and (f) in component (A) and to use the organic polyisocyanate, the modified polyisocyanate (a) or a mixture of said polyisocyanates and, if used, the blowing agent (d) as component (B).

The starting components are mixed at from 15 to 100° C., preferably at from 25° to 55° C., and introduced into the open or closed mold at atmospheric pressure or superatmospheric pressure. The mixing can be effected mechanically using a stirrer or a stirring screw or carried out under high pressure by the countercurrent injection method. The mold temperature is expediently from 20° to 120° C., preferably from 30° to 80° C., in particular from 45° to 65° C. If the moldings are to be produced in a closed mold, the degree of compaction is in the range from 1.2 to 8.3, preferably from 2 to 7, in particular from 2.4 to 4.5.

The amount of reaction mixture introduced into the mold is advantageously such that the moldings obtained have an overall density of from 0.1 to 0.98 g/cm$^3$, preferably from 0.3 to 0.7 g/cm$^3$. The addition of fillers allows densities of up to 1.2 g/cm$^3$ or more to be achieved.

The cellular PU elastomer prepared or the moldings produced from the cellular PU elastomer, by the process according to the invention are used, for example, in the automotive industry, for example as buffer or spring elements and as shock absorbers, and as cycle or motorcycle saddles. They are furthermore suitable as fenders and as shoe cores or soles.

EXAMPLES

The OH number and the mean molecular weight Mn (number average) were determined as follows:

The mean molecular weight Mn (number average) was calculated from the OH number (Mn=112,200/OH number). The OH number was determined by potentiometric titration by the phthalic anhydride method.

EXAMPLE 1

Preparation of the Polyether Carbonate Diols 1750 g (7.54 mol) of polyoxytetramethylenediol having Mn=232 and 778 g (6.59 mol) of diethyl carbonate were heated to the boil with 12.5 g (0.5% by weight) of tetraisopropyl orthotitanate, and the ethanol formed during this reaction was continuously separated from unreacted diethyl carbonate by distillation on a column (packing level: 25 cm, packing: 5 mm stainless steel meshes) at atmospheric pressure at a reflux ratio of 4:1. The reaction was carried out at 180° C. The low-boiling components were removed under reduced pressure at 0.3 mbar (30 Pa).

Yield: 1920 g
Mn=1970
OH number=57.

EXAMPLE 2

Preparation of a Cellular PU Elastomer by the Semi-Prepolymer Process

Component A 1000 g (0.508 mol) of polyether carbonate diol, prepared as described in Example 1, were mixed at 40° C. with
110 g (1.774 mol) of ethylene glycol
5 g of triethylenediamine (diazabicyclooctane),
1.7 g of silicone-based stabilizer (DC 193 from Dow Corning) and
40 g of trichlorotrifluoroethane.

The water content was adjusted to 0.3% by weight, based on the total weight, by adding water.

Component B

Urethane-containing polyisocyanate mixture having an NCO content of 19% by weight and prepared by reacting 1000 g (4 mol) of 4,4'-diphenylmethane diisocyante with 600 g (0.3 mol) of polyoxytetramethylene glycol having a mean molecular weight of 2000 for 1.5 hours at 80° C. and subsequently cooling the reaction mixture to 40° C.

In order to produce the molding,
100 parts by weight of component A and
97 parts by weight of component B
were mixed vigorously with stirring at 40° C. 375 g of the reaction mixture were introduced into a plate-shaped metallic mold having the internal dimensions 250×100×300 mm at a controlled temperature of 60° C., the mold was closed, and the reaction mixture was allowed to expand and cure.

After 10 minutes, the cellular PU elastomer having a density of 500 g/liter, was demolded.

COMPARATIVE EXAMPLE I

The procedure was similar to that of Example 1, but polyether carbonate diol was replaced by 1000 g of a polyoxytetramethylene glycol having a mean molecular weight of 2000.

The mechanical properties measured on the moldings are given in the table below.

EXAMPLE 3

Preparation of a Cellular PU Elastomer by the Prepolymer Process 700 g (0.355 mol) of polyether carbonate diol, prepared as described in Example 1, and
240 g (1.143 mol) of 1,5-naphthylene diisocyanate
were mixed at 130° C. with stirring and reacted for 30 minutes. The reaction mixture was then allowed to cool slowly to 90° C., giving an NCO-containing prepolymer having an NCO content of 6.5 % by weight.
2.6 parts by weight of a fatty acid ester (50% strength by weight aqueous emulsifier, additive SM from Bayer AG),
1.0 parts by weight of triethylenediamine and
3.4 parts by weight of polyether carbonate diol, prepared as described in Example 1,
were added at 90° C. with vigorous stirring to 100 parts by weight of this NCO-containing prepolymer, and 375 g of the reaction mixture were introduced into the mold described in Example 2, at a controlled temperature of 50° C., the mold was closed, and the reaction mixture was allowed to expand and cure for 20 minutes.

The mechanical properties mentioned below were measured on the moldings obtained.

COMPARATIVE EXAMPLE II

The procedure was similar to that of Example 3, but the polyether carbonate diol was replaced by 1000 g of a polyoxytetramethylene glycol having a mean molecular weight of 2000.

TABLE

Mechanical properties of the cellular PU elastomers prepared

|  | Example | | Comparative Example | |
|---|---|---|---|---|
|  | 2 | 3 | I | II |
| Density (DIN 53420) [g/liter] | 500 | 500 | 500 | 500 |
| Tensile strength (DIN 53 571) [N/mm$^2$] | 4.3 | 5.2 | 3.0 | 4.0 |
| Elongation at break (DIN 53 571) [%] | 590 | 460 | 480 | 260 |
| Tear propagation strength (DIN 53 515) [N/mm] | 12.9 | 12.4 | 14.3 | 12.8 |
| Compressive set at 70° C. (DIN 53 572) [%] | 14.0 | 12.4 | 6.2 | 6.5 |

We claim:

1. A process for the preparation of a cellular polyurethane elastomer by reacting
   a) an organic and/or modified organic polyisocyanate with
   b) at least one relatively high-molecular-weight polyhydroxyl compound and, if desired,
   c) a low-molecular-weight chain extender and/or crosslinking agent,
in the presence of
   d) a blowing agent,
   e) a catalyst and
   f) optionally additives and/or assistants,
wherein the relatively high-molecular-weight polyhydroxyl compound (b) is a polyether polycarbonate diol prepared by polycondensing b1) a polyoxytetramethylene glycol having a mean molecular weight Mn (number average) of from 150 to 500 or b2) a mixture comprising
   b2i) at least 10 mol-% of the polyoxytetramethylene glycol (b1) and
   b2ii) less than 90 mol-% of at least one polyoxyalkylene diol, other than (b1), comprising an alkylene oxide having 2 to 4 carbon atoms in the alkylene radical, at least one linear or branched alkanediol having 2 to 14 carbon atoms or at least one cyclic alkanediol having 3 to 15 carbon atoms or a mixture of at least two of said diols (b2ii)

with b3) phosgene, diphenyl carbonate or a dialkyl carbonate containing $C_1$- to $C_4$-alkyl groups.

2. A process as claimed in claim 1, wherein the cellular polyurethane elastomer has an overall density of from 0.1 to 0.95 g/cm$^3$.

3. A process as claimed in claim 1, wherein the organic polyisocyanate (a) is 4,4'-diphenylmethane diisocyanate or 1,5-naphthylene diisocyanate.

4. A process as claimed in claim 1, wherein the polyether polycarbonate diol has a mean molecular weight of from 800 to 8000.

5. A process as claimed in claim 1, wherein the polyoxytetramethylene glycol (b1) has a mean molecular weight Mn (number average) of from 150 to 400.

6. A process as claimed in claim 1, wherein the blowing agent is water.

7. A process as claimed in claim 1, wherein the blowing agent is an alkane having 3 to 5 carbon atoms and/or a cycloalkane having 4 to 6 carbon atoms.

8. A process as claimed in claim 1, wherein, as an additive (f), crystalline, microporous molecular sieve having a cavity diameter of less than 1.3 nm and comprising a metal oxide or metal phosphate is used.

9. A process as claimed in claim 1, wherein the reaction is carried out in a closed mold with compaction.

10. A process for the production of cellular moldings, preferably shock absorbers, by a process as claimed in claim 1.

* * * * *